US012779605B2

(12) United States Patent
Hofmann

(10) Patent No.: US 12,779,605 B2
(45) Date of Patent: Nov. 3, 2026

(54) SYSTEM FOR AUTOMATING A MACHINE TOOL

(71) Applicant: Zeroclamp GmbH, Bruckmühl (DE)

(72) Inventor: Klaus Hofmann, Bruck (DE)

(73) Assignee: ZeroClamp GmbH, Bruckmuhl (DE)

( * ) Notice: Subject to any disclaimer, the term of this patent is extended or adjusted under 35 U.S.C. 154(b) by 821 days.

(21) Appl. No.: 18/024,270

(22) PCT Filed: Aug. 19, 2021

(86) PCT No.: PCT/DE2021/100703
§ 371 (c)(1),
(2) Date: Jun. 30, 2023

(87) PCT Pub. No.: WO2022/048707
PCT Pub. Date: Mar. 10, 2022

(65) Prior Publication Data

US 2024/0293904 A1 Sep. 5, 2024

(30) Foreign Application Priority Data

Sep. 7, 2020 (DE) ..................... 10 2020 123 316.7

(51) Int. Cl.
*B23Q 7/04* (2006.01)
*B23Q 1/00* (2006.01)

(52) U.S. Cl.
CPC ............. *B23Q 7/04* (2013.01); *B23Q 1/0045* (2013.01)

(58) Field of Classification Search
CPC ............ B23Q 11/0089; B23Q 11/0085; B23Q 11/0891; B23Q 7/046; B23Q 7/04
See application file for complete search history.

(56) References Cited

U.S. PATENT DOCUMENTS

| | | | |
|---|---|---|---|
| 5,302,061 | A | 4/1994 | Terawaki |
| 2011/0006490 | A1 | 1/2011 | Puppala |

(Continued)

FOREIGN PATENT DOCUMENTS

| | | | |
|---|---|---|---|
| DE | 202013102222 U1 | 6/2013 | |
| DE | 102013106226 A1 | 12/2014 | |

(Continued)

OTHER PUBLICATIONS

International Search Report issued Nov. 15, 2021 in PCT/DE2021/100703.

(Continued)

*Primary Examiner* — Alan Snyder
(74) *Attorney, Agent, or Firm* — Nathan H. Calvert

(57) ABSTRACT

A system for automating a machine tool that is associated with an external device for feeding workpieces and/or tools to and/or removing workpieces and/or tools from the machine tool. The system includes at least one actuator for actuating a component of the machine tool. Alternatively or additionally to the at least one actuator, the system includes at least one sensor for detecting at least one signal of a display component or of a state of the machine tool or of the external device. A control unit is also included which is configured to trigger at least one function of the machine tool or of the external device by actuating the at least one actuator and/or to trigger at least one function of the external device as a function of a signal from the at least one sensor.

16 Claims, 5 Drawing Sheets

(56) References Cited

U.S. PATENT DOCUMENTS

| | | | | |
|---|---|---|---|---|
| 2014/0286734 | A1 | 9/2014 | Oda | |
| 2015/0276549 | A1* | 10/2015 | Lazic | B23F 23/02 209/552 |
| 2017/0021467 | A1* | 1/2017 | Suzuki | B23Q 11/0825 |
| 2017/0151642 | A1* | 6/2017 | Suzuki | B08B 15/023 |
| 2017/0254724 | A1* | 9/2017 | Lazic | B23Q 7/048 |
| 2018/0085874 | A1 | 3/2018 | Haas | |
| 2018/0262572 | A1 | 9/2018 | Schaerer | |

FOREIGN PATENT DOCUMENTS

| | | | |
|---|---|---|---|
| DE | 102014114258 | A1 | 8/2015 |
| DE | 102017215525 | A1 | 3/2019 |
| JP | S62102959 | A | 5/1987 |
| JP | 2001100820 | A | 4/2001 |
| JP | 2003071663 | A | 3/2003 |
| JP | 2018183863 | A | 11/2018 |
| JP | 2019150894 | A | 9/2019 |

OTHER PUBLICATIONS

JP 2023-512402 JPO Office action issued Mar. 5, 2025.
CN Patent Application 2021800545355 Office Action issued Jul. 19, 2025.

* cited by examiner

SYSTEM FOR AUTOMATING A MACHINE TOOL

TECHNICAL FIELD OF THE INVENTION

The invention relates to systems for automating a machine tool.

BACKGROUND OF THE INVENTION

A classic automation solution generally consists of a machine tool, a robot located outside the machine tool for feeding workpieces and/or tools to and/or removing workpieces and/or tools from the machine tool, a component store and a workpiece store. In an enclosed machining area of the machine tool, which can be opened for feeding and removing workpieces or tools, grippers are provided for the tools as well as clamping means for clamping workpieces. An automation solution may thus feed the workpieces and/or tools to the machine tool and/or remove workpieces and/or tools from the machine tool instead of an operator.

In such known systems for automating a machine tool, the machine tool and the other components are equipped with an electrical interface via which they communicate with each other or via which they communicate with a higher-level control unit, whereby the higher-level control unit can control the machine tool and the other components accordingly. The direct control of the clamping devices, which are generally operated with compressed oil or compressed air, is usually carried out by the machine tool itself. For example, in order to be able to control a clamping device on a rotary-swivel table of a 5-axis milling machine, complex rotary feed-throughs for these clamping devices have to be led through the rotary-swivel table in order to lead the pressure medium and, if necessary, electrical control lines for actuating directional control valves of the clamping device.

Usually, such communication interfaces are designed by machine tool manufacturers as proprietary interfaces in order to connect their own automation components. Third-party manufacturers of automation components are therefore usually denied access to the machine tool, either because the manufacturer does not disclose the electrical specifications of the interface or because complex mechanical adapters would be required to mechanically connect the components of the third-party manufacturer. In addition, many machine tools are not intended or suitable for integration into an automation solution and therefore do not have any suitable interfaces. The necessary hardware, in particular rotary feed-throughs to rotary-swivel tables or automatic drives for opening and closing the machine doors, is also not available. A possible retrofit often fails because of the high costs involved.

SUMMARY OF THE INVENTION

An object of the invention is to provide systems for automating a machine tool, which enable the integration of a machine tool that has no suitable interfaces for connecting an automation solution, in particular an external device for feeding machine objects to the machine tool and/or removing machine objects from the machine tool. As used in this disclosure and the accompanying claims, the designation "machine object" refers to a tool for a machine tool or a workpiece for a machine tool. Thus the phrase "feeding machine objects to a machine tool" as used herein is equivalent to "feeding workpieces and/or tools to the machine tool." Additionally, "and/or" as used herein when referring to two options means either option individually or both options together.

Automation systems according to aspects of the invention may take over all the activities of an operator for loading and unloading the machine without having to retrofit additional interfaces or automation hardware to the machine. Further objects of the invention include providing a computer program product as well as an actuator and a sensor for such a system.

According to a first aspect of the invention interfaces to a machine tool to be automated by means of an external device (hereinafter also referred to sometimes as a "robot") for feeding workpieces and/or tools to and/or removing workpieces and/or tools from the machine tool are dispensed with by using suitable actuators and/or sensors in communication with a control unit. The control unit is configured to trigger at least one function of the machine tool by controlling the at least one actuator and/or to trigger at least one function of the external device depending on a signal from the at least one sensor.

One advantage of this first aspect is that the system, which represents an automation solution, to may take over certain tasks of an operator, for example, pressing a start button on a control panel of the machine tool, opening and closing a door of the machine tool depending on a display on the control panel of the machine tool, among other examples.

The external device may be a stationary robot and include one or more magazines for storing machine objects, that is, workpieces and/or tools. The external device may be stationarily positioned in front of the opening of the machining area of the machine tool, which can be closed by a door. The external device may have at least one arm for feeding and removing tools or workpieces into and from the machine tool. In some embodiments, several workpieces and/or tools may be fed simultaneously in one feed process and several workpieces and/or tools can be removed simultaneously in one removal process. The several workpieces and/or tools may also be arranged in a magazine for this purpose.

The control unit may be integrated into the external device or may comprise a higher-level control unit that communicates with a machine control unit. The machine control unit and the higher-level control unit may communicate wirelessly and thus dispense with complex cabling.

In some embodiments, the control unit may be integrated with the external device. Also, the machine control unit and the control unit (which performs the automation functions) may be integrated, i.e. implemented as a single control unit. In some embodiments, automation may include triggering at least one specific function of the external device depending on (e.g., in response to) the signal from one or more sensors that detect a parameter or a state of the machine tool. Due to the already existing communicative coupling of the control unit and machine control unit, an actuator would not necessarily be required for actuating a component of the machine tool, for example an electric switch or other actuating element of the machine tool.

Some embodiments may include one or more actuators without a separate sensor for detecting at least one signal of a display component or a state of the machine tool or the external device.

However, one or more actuators and one or more sensors may be provided in some implementations, in particular to achieve the most complete automation of the machine tool.

According to some embodiments, the at least one actuator and the at least one sensor are wirelessly connected to the control unit. This eliminates the need for communication cables arranged between the sensors or actuators and the control unit. This is particularly important for sensors or actuators that are arranged on a moving part of the machine tool, for example, arranged on a rotary-swivel table.

The at least one actuator in some embodiments may be a control element actuating device and comprise at least one electrically, pneumatically, or hydraulically driven actuating element. The actuating element may be, for example, a linearly movable actuating element, which may actuate a pressure switch or a push-button on a control panel of the machine tool.

In some embodiments, the actuator may be a door opener for a single or double door of the machine tool. For example, the actuator may include an actuating device for opening and closing the door, which can also be designed as a double door, including, for example, drive rollers.

The actuator may be a clamping device for use in the machine tool. The clamping device may directly clamp a workpiece or fix another clamping device, for example a vice, which can also be designed as an actuator.

According to some embodiments, the at least one sensor may be an optical sensor, for example a photodiode or camera. Such a sensor may, for example, be arranged on a control panel of the machine tool and detect the state of a light-emitting diode or the output on a screen (in the form of any displays or characters). The sensor can be arranged such that only the direct sensor signal with the relevant information content is transmitted to the control unit or that signal processing already takes place in the sensor and only the result of the signal processing, for example an ON/OFF message for a light emitting diode, is transmitted to the control unit.

In some embodiments, the at least one sensor and/or the at least one actuator can be mechanically coupled, for example glued or screwed, to the machine tool, in particular to a control panel or a housing of the machine tool. This results in simple mounting for such a sensor or actuator. For example, a suitable adhesive can be provided on one or more suitable mounting surfaces of a sensor or actuator on one side and the other side of the adhesive is covered with a peelable film. For mounting, the film can be removed and the sensor may be placed on a surface of the machine tool and pressed on.

A sensor according to some embodiments can monitor the clamping force or a correct clamping state of a clamping device. In the latter case, the sensor and the actuator can be an integrated module.

In some embodiments, a sensor or actuator can be designed as an independent module.

All or some selected sensors and actuators can be designed to be self-sufficient and each include its own, in particular rechargeable, energy supply. The energy supply can be an electrical energy supply, for example a rechargeable battery. The battery can be charged inductively, i.e. contactless, or by cable by connecting it to a charging device. Batteries may be exchanged and charged via a separate device or non-rechargeable batteries may be used. Alternatively or additionally, a power supply in the form of a pneumatic pressure reservoir can be provided. In this case, recharging can be done by supplying compressed air, for example by means of a movable arm of the external device. The self-sufficient design of a sensor or actuator makes it possible to ensure the respective functionality without having to establish a permanently available energy supply via the machine tool or the external device.

In some embodiments, the external device may be a stationary device with at least one movable arm for feeding workpieces and/or tools to and/or removing workpieces and/or tools from the machine tool. The at least one arm can additionally serve to supply compressed air to actuators that are arranged for pneumatic actuation of a respective actuating element.

The control unit in some implementations can include a computer program which, when running in the control unit of the machine tool, causes the control unit to communicate with the external device and to control the at least one actuator, possibly taking into account the information provided by the at least one sensor, in such a way that the sequence of processes of the machine tool is automated, in particular the starting of a machining sequence for a workpiece, the opening or closing of a door of the machine tool, the removal of a partially or completely finished workpiece or the feeding of a workpiece to be machined, and the removal or feeding of tools into the machine tool. The computer program can also be stored in the control unit or stored on a data carrier (that is, a non-transitory computer readable data storage device) or in a cloud and loaded from the data carrier or the cloud into a working memory of the control unit.

These and other aspects, advantages, and features of the invention will be apparent from the following description of representative embodiments, considered along with the accompanying drawings.

DESCRIPTION OF REPRESENTATIVE EMBODIMENTS

Figure 1:
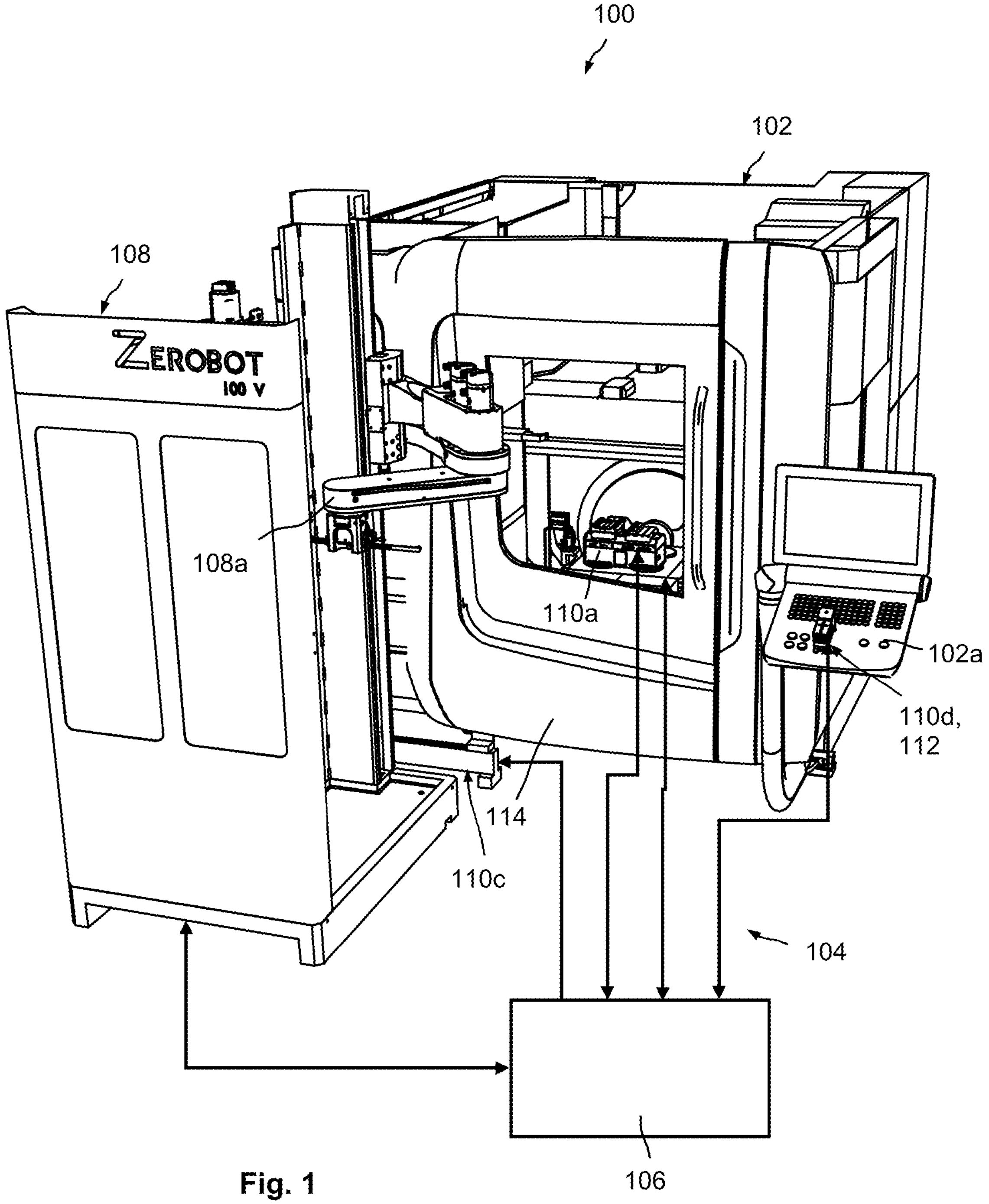
FIG. 1 is a schematic and perspective view of a machine tool together with an embodiment of a system for automating the machine tool.
Figure 2:
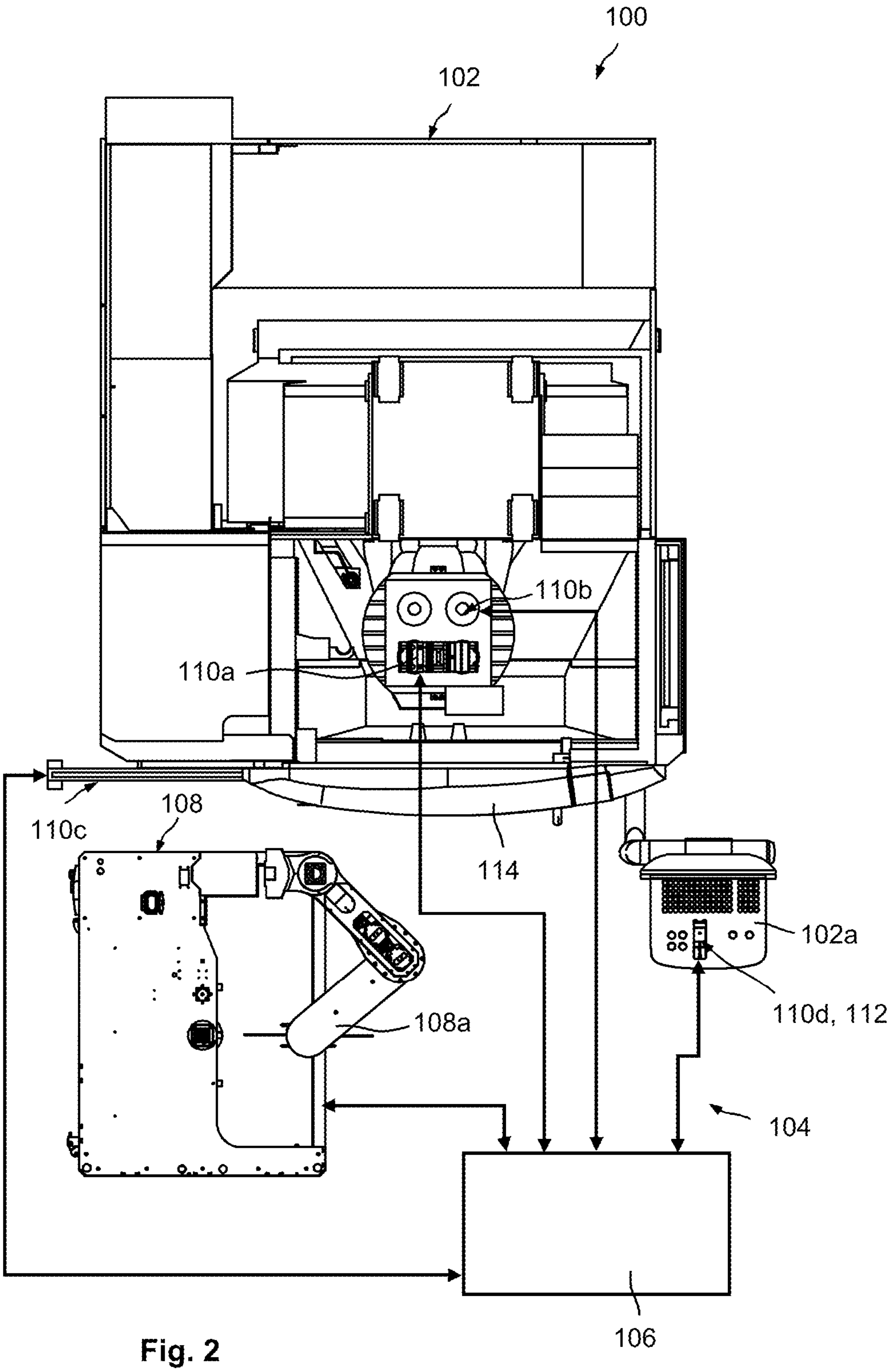
FIG. 2 is a top view of the illustration in FIG. 1.

FIG. 1 shows an overall system 100, which includes a machine tool 102 and a system 104 for automating a machine tool. Only a control unit 106 of the automation system 104 and the communication connections are shown schematically. FIG. 2 shows a top view of the overall system 100 of FIG. 1.

For the sake of clarity, FIG. 3 again shows the automation system 104 without the machine tool 102 in the same view as FIG. 2.

Figure 4:
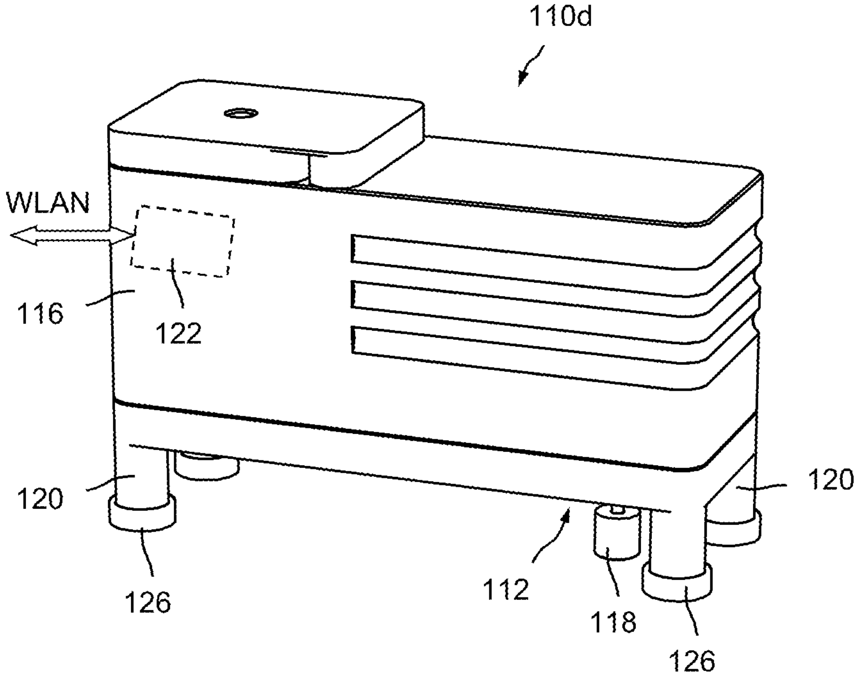
FIG. 4 is a perspective view of a self-sufficient actuator.

As can be seen from these figures, the automation system 104 comprises, in addition to the control unit 106, an external device 108 for feeding workpieces and/or tools (machine objects) to and/or removing workpieces and/or tools (machine objects) from the machine tool 102, which is also referred to as a "robot" in the context of this description. Furthermore, the automation system 104 comprises multiple actuators in the form of a clamping device 110*a* configured as a vice, in the form of a clamping device 110*b* configured as a zero-point clamping system (FIG. 2), in the form of a door opening device 110*c*, and in the form of a control element actuating device 110*d*. Finally, the automation system 104 comprises at least one sensor 112. In the present case, a sensor 112 is integrated in the control element actuating device 110*d* (FIG. 4). At least one sensor (not shown) may also be integrated into each of the actuators

Figure 3:
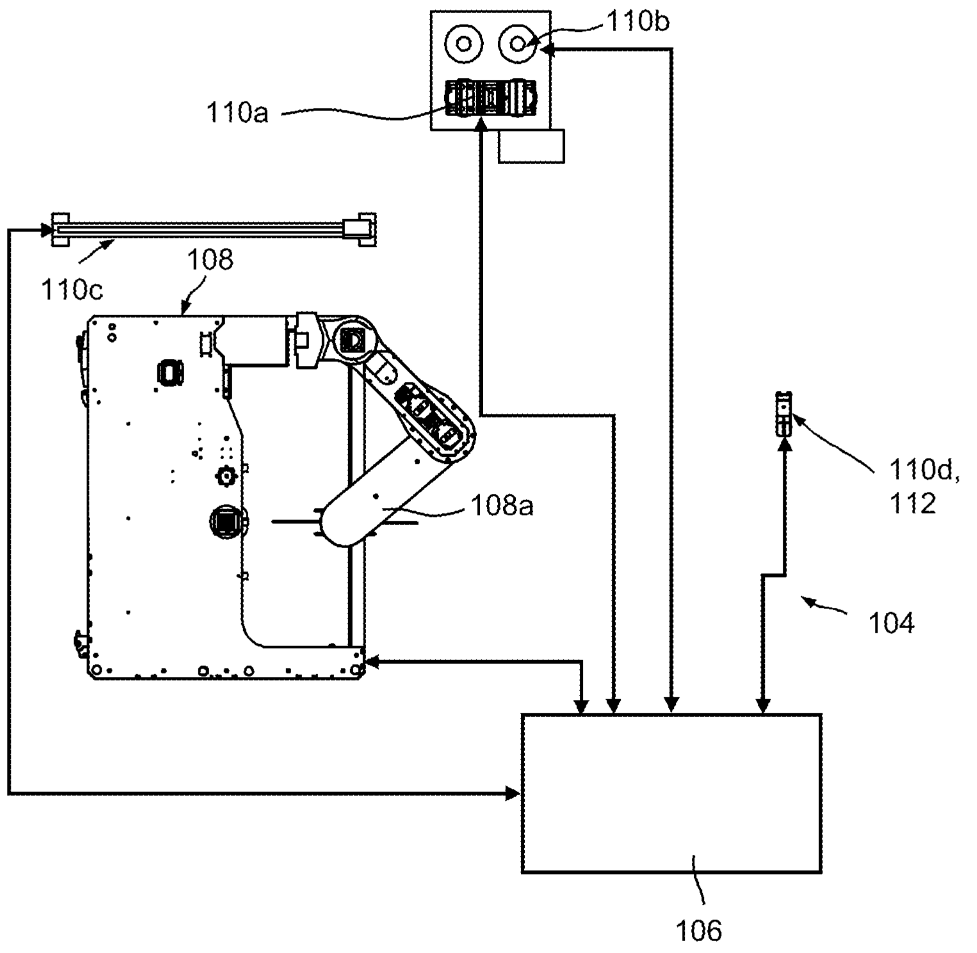
FIG. 3 is a top view of the embodiment according to FIG. 1, but without the machine tool to be automated.

110*a*, 110*b* and 110*c*. Here, the sensors for the vice 110*a* and the zero-point clamping system 110*b* may be pressure sensors if these components are designed as pneumatically or hydraulically operating components. The door opening device 110*c* may also comprise a sensor, which detects, for example, the position of the door or the drive for the door (and thus the door). In FIGS. 1 to 3, the communication links between these actuators 110*a-d* and the control unit 106 are shown as bidirectional connections which may be wired or wireless connections.

With these components, the automation system 104 makes it possible to automate the machine tool 102 to a predetermined extent and thereby to perform actions in an automated manner which, in the case of a non-automated machine tool, must be performed by an operator. In particular, these actions may include feeding workpieces and/or tools to and/or removing workpieces and/or tools from the machine tool 102, opening or closing a door 114 of the machine tool 102 that closes off the machining area, and starting a machining cycle, among other examples.

The robot 108 has at least one moveable arm 108*a* with which the robot 108 can grip workpieces or tools (not shown) and feed them into the machining space of the machine tool 102 or remove them therefrom. The robot may also have magazines, not shown, for storing workpieces and tools.

In the example embodiment shown in the figures, a controllable actuator comprising zero-point clamping system 110*b* is provided in the machining space of the machine tool 102, which system may be mounted, for example, on a rotary-swivel table of the machine tool. In the illustrated example, an actuator in the form of controllable vice 110*a* is held on the zero-point clamping system 110*b*. Both actuators 110*a* and 110*b* are controllable at least to the extent that the respective actuator can be transferred to a clamping position or a released position by means of a control command.

It is also possible for sensors to be provided in each actuator, including in each of the actuators 110*a* and 110*b*, which detect certain events or states, for example whether the respective actuator moves from one position to another position and/or whether the predetermined position is actually reached or held. However, the sensor(s) in question can also be designed as separate modules.

The actuator comprising door opening device 110*c*, has a drive which is operable to move the door, which may be designed as a sliding door, and to transfer it between an open and closed position. The door opening device 110*c*, like all other actuators, can be designed as an independent module. This module may also be subsequently connected to the frame of the machine tool 102 or to the floor in a position in which the actuator is coupled to the movable door 114. Of course, the door opening device 110*c* may also have one or more sensors that detect the respective position of the drive and/or the door 114.

The actuator comprising a control element actuating device 110*d*, is arranged on a control panel 102*a* of the machine tool 102 and is configured to actuate one or more associated control elements of the control panel 102*a*.

Figure 5:
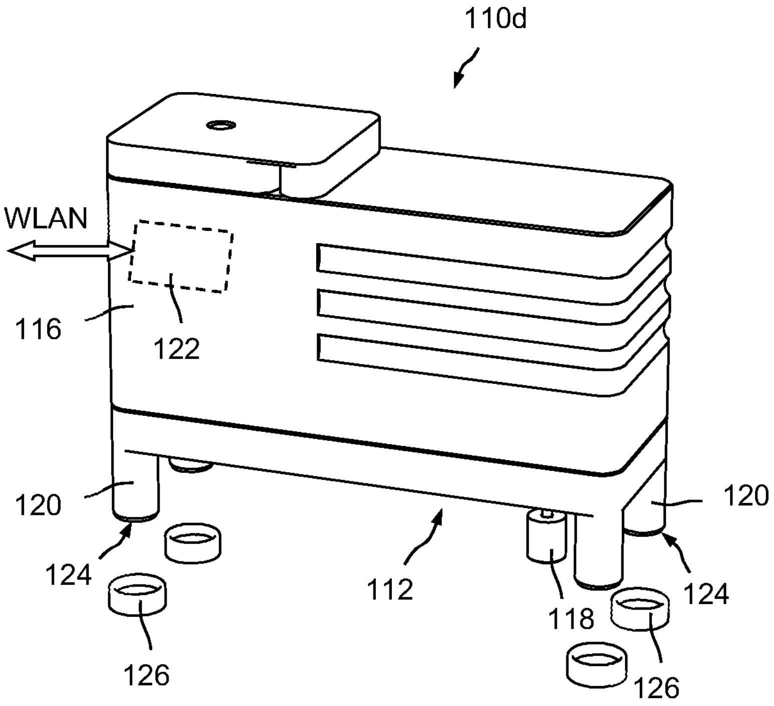
FIG. 5 is a perspective view of the actuator of FIG. 4, but with the actuator lifted off the mounting shoes.

As can be seen from FIGS. 4 and 5, the actuator 110*d* may also be formed as an independent module. An electrical, programmatic, or hydraulic drive for an actuating element 118 is provided in a housing 116 of the control element actuating device 110*d*. In the illustrated embodiment example, the actuating element 118 is formed as a linearly movable, cylinder-like element which projects downwards from the housing 116. The housing 116 has four feet 120 on its underside, with which the control element actuating device 110*d* can be placed on the control panel 102*a* and connected thereto. The connection can be made, for example, by gluing or screwing. In any case, the connection must be designed in such a way that the housing is secured against displacement and lifting with respect to or from the surface of the control panel 102*a*, even if a force is exerted by means of the actuating element 118 to actuate the relevant control element (not shown) of the control panel 102*a*. For assembly, the control element actuation device 110*d* must be aligned, in some embodiments, over the relevant control element of the control panel 102*a* such that the actuation element 118 is positioned exactly over the control element to be actuated. In this position, the housing 116 is then connected to the control panel 102*a*.

In the variant of an actuator 110*d* shown in FIG. 4, the fixing to a base, for example the surface of a control panel 102*a* of the machine tool 102, is carried out by means of permanent magnets 124, which are fastened to the underside of the feet 120, for example held in corresponding recesses in the underside of the feet 120 (see FIG. 5). To enable easy removal or disassembly of the actuator 110*d*, mounting shoes 126 are provided, which can be firmly connected to the base with their underside, for example by gluing or screwing. In an upper area, the fastening shoes 126 have recesses into which the lower areas of the feet 120 can be inserted. The recesses are designed in such a way that the feet are fixed against lateral displacement. The fastening shoes can be made of a ferromagnetic material to ensure a fastening force between the magnets 124 or the feet 120 firmly connected thereto. However, the bottom of the pot-shaped fastening shoes 126 can also be designed in another variant in which the material of the fastening shoes 126 is not ferromagnetic and is made of plastic, for example, so that a sufficient fastening force is also obtained in this case.

FIG. 5 shows the actuator 110*d* in a position in which the feet 124 of the actuator are released from or lifted off the fastening shoes 126. Thus, the variant of an actuator 110*d* shown in FIGS. 4 and 5 allows the actuator to be easily fixed to the base, for example by gluing the fixing shoes 126 to the base, and the actuator to be dismantled by simply lifting the actuator 110*d* out of the fixing shoes 126, which remain connected to the base. Nevertheless, the actuator 110*d* is sufficiently firmly connected to the base by means of the fastening shoes 126 and in particular secured against lateral displacement. Lifting off the actuator 110*d* makes it possible, if necessary, to easily manually actuate the actuating element which is usually actuated by the actuator 110*d*. This may also apply to other actuating elements that are concealed by the actuator 110*d* in its mounting position to allow for manual actuation.

The embodiment shown in FIG. 4 has a WLAN module 122, which also includes an antenna and not shown in more detail, which is arranged in the housing 116. In some embodiments, a wireless connection can also be provided for each differently designed actuator 110*a-d* or also for each sensor 112.

As mentioned above, a sensor is also arranged in the housing of the actuator 110*d*, which sensor is designed to detect whether the control element in question has a certain status. For example, the control element can be designed as an illuminated push button, wherein the illumination is active when the push button can/must be pressed, for example to trigger a machining cycle of the machine tool 102. In this case, the sensor may be designed as an optical sensor. The sensor can also be designed to detect the status of another display element of the control panel 102*a* and, depending on this status, trigger an action, for example pressing an associated button or actuating an associated switch.

The sensors can of course also be designed in other ways. An optical sensor can also be designed as a camera, which detects a display or also any other notification of a control panel (e.g. error notifications by means of LEDs or other illuminating elements) or a state of any other element of the machine tool. Using image evaluation methods (including an OCR method), the control unit 106 can determine the required sensor information from the sensor signal supplied to it (in this case, the image signal from the camera), for example the request for a particular tool on a screen in plain text or as a symbol for an operator, and depending on this, control the robot 108 and/or the actuators 110*a-d* in a suitable manner. It is also conceivable for any information on the screen or the control panel 102*a* of the machine tool 102 to be detected via a sensor 112 in the form of a camera and transmitted, in particular streamed, to one or more other participants in a network that are located in the same network as the automated machine tool 102 or the overall system 100.

The sensors 112 can be designed in such a way that they only transmit the pure sensor signal to the control unit 106, in which case the control unit 106 evaluates the sensor signal, for example examines it for certain characteristic events. Alternatively, the sensors 112 may also be such that they have a certain intelligence and, in particular, perform a high level of processing of the directly detected sensor signal. In this case, the sensors may already transmit certain information, for example as digital information, to the control unit. For example, an optical sensor 112 can be designed to detect the colour of a display LED and transmit the relevant information, e.g., "RED", "GREEN", "YELLOW", to the control unit 106.

The robot 108 as well as the actuators 110*a-d* and sensors 112 can be in any type of communication connection with the control unit 106. While a wired connection is also possible for the connection to the robot 108, a wireless connection may be preferred for the connection between the sensors 112 and the actuators 110 and the control unit 106. This provides much greater flexibility and saves the costs associated with cabling. In the case of actuators positioned in the machining area of the machine tool 102, it would also be associated with difficulties to run the relevant cabling to the outside. If the actuators are also arranged on moving elements, for example a rotary/swivel table of the machine tool 102, a complex and cost-intensive rotary feed-through would also be required. Additionally or alternatively, a wired connection to the control unit 106 can be used for the sensors 112 and actuators 110*a-d* if this is necessary or advantageous.

The control unit 106 may be located in or on the robot 108 and may be integrated with the control unit of the robot 108. The control unit 106 can be alternatively provided at any other location, for example in a control station for the automated machine tool or a control station for several automated machine tools.

The actuators 110 and sensors 112 can be designed as self-sufficient modules, wherein such a module can also comprise several actuators 110 and/or sensors 112. For this purpose, such a module can have its own power supply, for example a rechargeable battery. Additionally or alternatively, a replaceable battery can be provided, which may or may not be rechargeable.

Instead of or in addition to an electrical energy supply, a pressure energy supply, in particular a pneumatic energy supply, can be provided. For example, a pneumatically operating actuator 110 can have a pressure reservoir, which can be designed to be rechargeable. For this purpose, for example, the actuator can have a pressure connection to which compressed air can be supplied, for example via the arm 108*a* of the robot 108. In some embodiments, compressed air cay be supplied via a compressed air lance which is inserted into the compressed air connection. Such variants are particularly suitable for actuators 110 that are designed as pneumatic clamping devices, for example in the form of the vice 110*a* or the zero-point clamping system 110*b*.

Finally, it should be noted that the actuators 110*a-d*, in particular the actuator designed as control element actuating device 110*d*, can be positioned at any desired location on the machine tool to be automated or on a component connected thereto at which a required action must be triggered. For example, a control element actuating device 110*d* can be positioned on an already existing door opener module if an actuating element, e.g. an electric switch, is provided on this for triggering the desired door movement.

The same applies to the sensors 112, which can also be located at any point on the machine tool to be automated or on a component connected to it, at which parameters or information that are required for automating the machine tool must be detected.

The control unit 106 can be implemented in the usual manner as a combination of hardware and software, wherein the software can be designed for evaluating the sensor signals or the information provided by the sensors and for triggering the functions of the actuators depending on predetermined parameters, which can also be determined from the sensor signals. The software may be permanently stored in the control unit 106, including in whole or in part in the form of firmware, or may be made accessible to the control unit 106 for running therein by means of an external memory (including a cloud-based memory). Finally, it is also possible to run the software in a higher-level control unit and to supply it only with the signals and/or information provided by the sensors and to supply the control signals provided by the higher-level control unit to a local control unit, for example a control unit provided in the robot 108, which is connected to the sensors and actuators.

As used herein, whether in the above description or the following claims, the terms "comprising," "including," "carrying," "having," "containing," "involving," and the like are to be understood to be open-ended, that is, to mean including but not limited to.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described representative embodiments are intended to illustrate the principles of the invention, but not to limit the scope of the invention. Various other embodiments and modifications to these representative embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

LIST OF REFERENCES

100 Complete system consisting of automation system and machine tool
102 Machine tool
102*a* Control panel
104 Automation system
106 Control unit
108 External device/robot
108*a* Arm
110 Actuator
110*a* Vice
110*b* Zero-point clamping system
110*c* Door opening device
110*d* Control element actuating device
112 Sensor
114 Door
116 Housing
118 Actuating element
120 Foot
122 WLAN module
124 Magnet
126 Fixing shoe

The invention claimed is:

1. A system for automating a machine tool where the machine tool is associated with an external device arranged for one or both of feeding machine objects to the machine tool and removing machine objects from the machine tool, the system comprising:
(a) an actuator and a sensor, wherein the actuator is arranged for actuating a component of the machine tool and the sensor is arranged for detecting at least one of a signal of a display system or a state of the machine tool; and
(b) a control unit configured to, independent of any communication interface between the machine tool and the control unit, (i) trigger at least one function of the machine tool by controlling the actuator or (ii) trigger at least one function of the external device in response to a signal from the sensor or (iii) trigger the at least one function of the machine tool by controlling the actuator and trigger the at least one function of the external device in response to the signal from the sensor.

2. The system of claim 1 wherein:
(a) the system includes the actuator and at least one additional actuator and each additional actuator is arranged for actuating a respective component of the machine tool; and
(b) the control unit is configured to, independent of any communication interface between the machine tool and the control unit, trigger a respective additional function of the machine tool or a respective additional function of the external device by controlling the respective additional actuator.

3. The system of claim 2 wherein:
(a) the system includes the sensor and at least one additional sensor and each additional sensor is arranged for detecting at least one of a respective additional signal of the display system, a respective additional state of the machine tool, and a respective additional state of the external device; and
(b) the control unit is configured to, independent of any communication interface between the machine tool and the control unit, trigger a respective additional function of the external device in response to a respective additional signal from the respective additional sensor.

4. The system of claim 1 wherein:
(a) the system includes the sensor and at least one additional sensor and each additional sensor is arranged for detecting at least one of a respective additional signal of the display system, a respective additional state of the machine tool, and a respective additional state of the external device; and
(b) the control unit is configured to, independent of any communication interface between the machine tool and the control unit, trigger a respective additional function of the external device in response to a respective additional signal from the respective additional sensor.

5. The system of claim 1 wherein the actuator, the sensor, or both the actuator and the sensor is wirelessly connected to the control unit.

6. The system of claim 1 wherein the actuator comprises a control element actuating device and includes at least one electrically, pneumatically, or hydraulically driven actuating element.

7. The system of claim 1 wherein the actuator includes a door opening device for a single or double door of the machine tool.

8. The system of claim 1 wherein the actuator is configured as a clamping device for use in the machine tool.

9. The system of claim 8 wherein the sensor is arranged to monitor clamping force or a correct clamping state of the clamping device.

10. The system of claim 1 wherein the sensor includes an optical sensor.

11. The system of claim 1 wherein one or both of the sensor and the actuator is arranged or arrangeable to mechanically couple with the machine tool.

12. The system of claim 1 wherein one or both of the sensor and the actuator include an energy supply or a rechargeable energy supply.

13. The system of claim 1 wherein the external device includes a stationary device with at least one movable arm that is arranged for at least one of feeding machine objects to the machine tool and removing machine objects from the machine tool.

14. The system of claim 1 wherein the control unit comprises a computer program that is executable to cause the control unit to communicate with the external device and to control the actuator for at least one of starting a machining sequence for a workpiece, opening or closing a door of the machine tool, removing a partially or completely finished workpiece, feeding a respective workpiece to the machine tool, feeding a tool to the machine tool, or removing a tool from the machine tool.

15. The system of claim 1 wherein the control unit includes an independent control unit separate from the external device and the machine tool, the independent control unit communicatively coupled to the external device and at least one of the actuator and the sensor.

16. A program product comprising one or more non-transitory computer readable data storage devices storing program code for the system of claim 1, the program code comprising instructions executable to trigger the at least one function of the machine tool, trigger the at least one function of the external device, or both trigger the at least one function of the machine tool and trigger the at least one function of the external device.

* * * * *